Patented Oct. 22, 1929

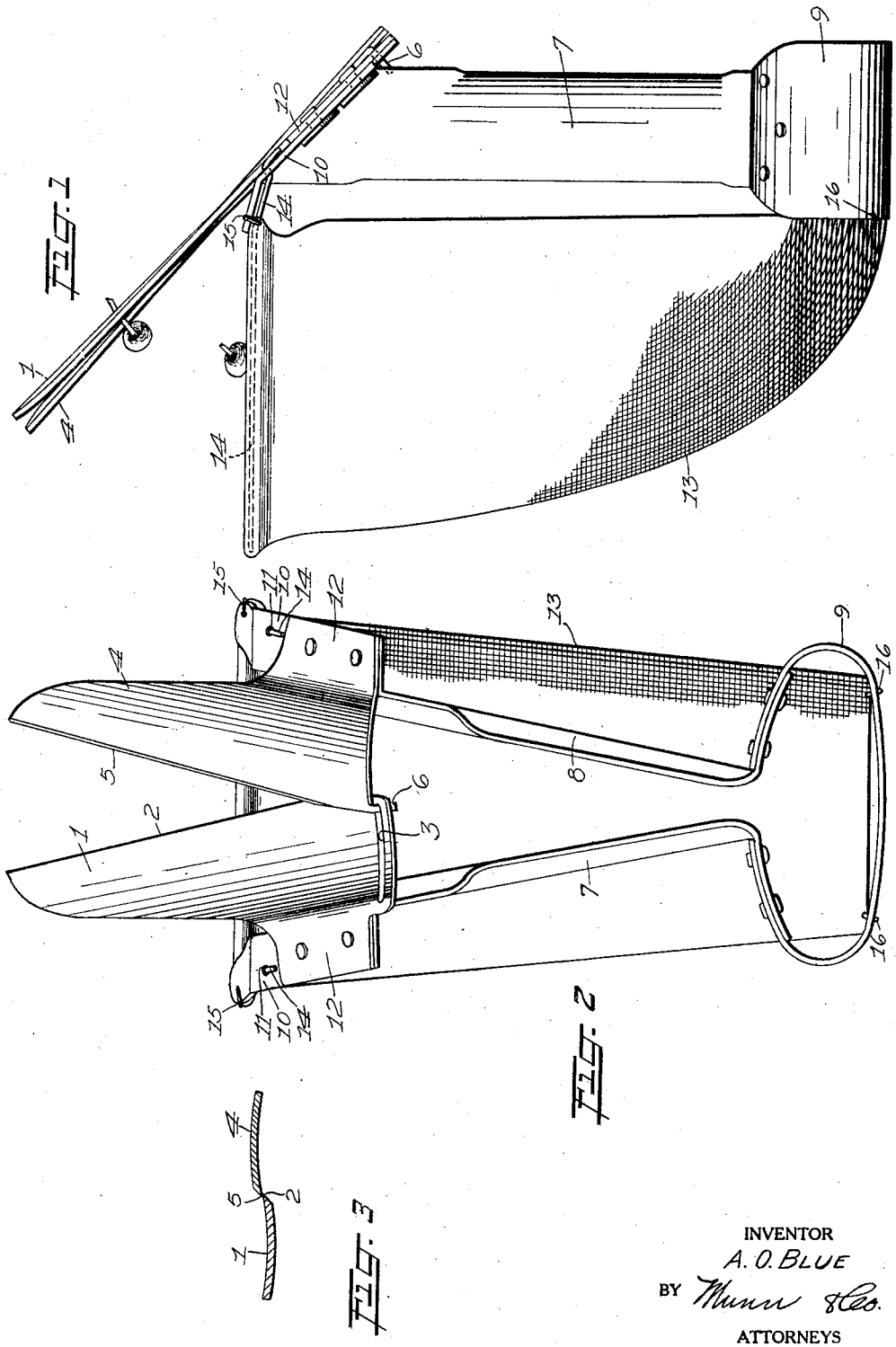

1,732,252

UNITED STATES PATENT OFFICE

AMASA ORVILLE BLUE, OF TRAVERSE CITY, MICHIGAN

FRUIT-GATHERING DEVICE

Application filed June 26, 1926. Serial No. 118,819.

My invention relates to improvements in fruit gathering devices, and it consists in the combinations, constructions, and arrangements herein described and claimed.

An object of my invention is to provide a fruit gathering device with which fruit may be gathered without being injured or destroyed, as when picking cherries. It is well known that when picking cherries by hand, the cherries are frequently destroyed by separating the stems and the pits from the remainder of the cherries.

A further object of my invention is to provide a device of the type described with which fruit may be gathered more readily.

A further object of my invention is to provide a device of the type described in which the cutting members are so constructed that they will automatically sharpen each other as the device is used.

A further object of my invention is to provide a device of the type described which has novel means for receiving the fruit as it is gathered.

Other objects and advantages will appear in the following specification, and the novel features of the invention will be particularly pointed out in the appended claim.

My invention is illustrated in the accompanying drawings, forming part of this application, in which Figure 1 is a side elevation of the device, Figure 2 is a rear elevation of the device, and Figure 3 is a section through the blades at a point of contact.

In carrying out my invention, I provide a concave blade 1 having a cutting edge 2 and a horizontally disposed slot 3. A convex blade 4 having a cutting edge 5 is provided with a lug 6 which extends downwardly at right angles therefrom, and is adapted to move horizontally in the slot 3. Handles 7 and 8 are provided with outwardly extending lugs to which a resilient spring 9 is rigidly secured. The free ends of the handles 7 and 8 are provided with transversely extending flanges 10 and the flanges are provided with lip portions having openings 11 therein. The blades 1 and 4 have integral outwardly extending portions 12 which are rigidly mounted upon the flanges 10. The blade 1 extends at an angle of 46° from the handle 7, and the blade 4 extends at an angle of 45° from the handle 8.

A receptacle 13 having a resilient wire 14 disposed in the upper end thereof is rigidly secured to the lip portions of the flanges 10 at 15 and the spring 9 at 16. The ends of the resilient wire 14 pass through the openings 11 and turn downwardly, as clearly shown in Figure 1.

From the foregoing description of the various parts of the device, the operation thereof may be readily understood. The handles 7 and 8 may be gripped by the hand of the operator. By positioning the blades 1 and 4 in alignment with the stem of the fruit which the operator desires to gather, the operator may move the handles 7 and 8, together with the blades 1 and 4 toward each other, thus severing the stem and permitting the fruit to drop into the receptacle 13, see Figure 1. This operation may be continued until the receptacle is filled with the fruit, and the receptacle may then be readily emptied.

The purpose of having the blades extend at different angles is to provide a positive shearing connection for the full length of the blades.

I claim:

A device of the type described comprising a pair of handles, a resilient member having its ends secured to said handles for normally holding said handles outwardly, transversely extending flanges integral with said handles, said flanges having lip portions provided with openings, cutting blades secured to said flanges, one of said blades having an elongated slot therein, a transversely extending lug integral with the other of said blades and receivable in said slot for limiting the movement of said blades and said handles outwardly, a receptacle having an open end and a closed end, said closed end being secured to said resilient member, and a resilient supporting member secured to said receptacle at the open end, the ends of said resilient member being secured to said flanges, said receptacle being secured to said lips at the open end thereof.

AMASA ORVILLE BLUE.